(12) United States Patent
Lennen

(10) Patent No.: US 11,340,353 B2
(45) Date of Patent: May 24, 2022

(54) MULTIPATH MITIGATION FOR GNSS RECEIVERS

(71) Applicant: Samsung Electronics Co., Ltd., Suwon-si (KR)

(72) Inventor: Gary Lennen, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 16/408,277

(22) Filed: May 9, 2019

(65) Prior Publication Data

US 2020/0264315 A1 Aug. 20, 2020

Related U.S. Application Data

(60) Provisional application No. 62/805,876, filed on Feb. 14, 2019.

(51) Int. Cl.
*G01S 19/22* (2010.01)

(52) U.S. Cl.
CPC .................................. *G01S 19/22* (2013.01)

(58) Field of Classification Search
CPC ............................ G01S 19/22; G01S 19/428
See application file for complete search history.

(56) References Cited

U.S. PATENT DOCUMENTS

| | | | | |
|---|---|---|---|---|
| 5,692,008 A * | 11/1997 | Van Nee | ................. | G01S 19/22 |
| | | | | 342/357.25 |
| 6,184,822 B1 * | 2/2001 | Fenton | ................... | G01S 19/32 |
| | | | | 342/357.69 |
| 6,541,950 B2 * | 4/2003 | Townsend | ............... | G01S 19/22 |
| | | | | 324/613 |
| 7,221,701 B2 | 5/2007 | Arikan et al. | | |
| 8,306,093 B2 * | 11/2012 | Chen | ....................... | G01S 19/22 |
| | | | | 375/148 |
| 8,947,298 B2 | 2/2015 | Yamamoto et al. | | |
| 9,891,325 B2 | 2/2018 | Milyutin et al. | | |
| 10,585,195 B2 * | 3/2020 | Marmet | ................. | H04B 1/709 |

OTHER PUBLICATIONS

Kaplan et al., "Understanding GPS Principles and Applications", 2006, 2nd edition, pp. 67-112 and 153-241 (Year: 2006).*

(Continued)

*Primary Examiner* — Cassi J Galt
(74) *Attorney, Agent, or Firm* — Lewis Roca Rothgerber Christie LLP

(57) ABSTRACT

A system and method for multipath estimation and mitigation is disclosed. In some embodiments, the method includes performing a first weight estimation operation for a first number of multipath components of a received correlation, calculating a remaining error energy by subtracting a sum of estimated multipath components from the received correlation, determining whether a satisfaction criterion is met for the remaining error energy, and, in response to determining that the satisfaction criterion is not met, performing a second weight estimation operation for a second number of multipath components, the second number being greater than the first number.

20 Claims, 17 Drawing Sheets

(56) References Cited

OTHER PUBLICATIONS

Yang et al., "A Novel First Arriving Path Detection Algorithm Using Multipath Interference Cancellation in Indoor Environments", Dept. of Electrical and Computer Engineering, The University of Western Ontario, Canada & Electronics and Telecommunications Research Institute, Korea, 2010, 5 pages.
Sahmoudi et al., "Multipath Mitigation Techniques Using Maximum-Likelihood Principle", InsideGNSS, Navigation Research Group, Lacime Lab, Ecole De Technologie Superieure, Montréal, Canada, Nov./Dec. 2008, 6 pages.

\* cited by examiner

MULTIPATH MITIGATION FOR GNSS RECEIVERS

CROSS-REFERENCE TO RELATED APPLICATION(S)

The present application claims priority to and the benefit of U.S. Provisional Application No. 62/805,876, filed Feb. 14, 2019, entitled "SYSTEM AND METHOD FOR PROVIDING MULTIPATH MITIGATION IN GLOBAL NAVIGATION SATELLITE SYSTEM (GNSS) RECEIVER", the entire content of which is incorporated herein by reference.

FIELD

One or more aspects of embodiments according to the present disclosure relate to navigation, and more particularly to multipath mitigation in a global navigation satellite system receiver.

BACKGROUND

A global navigation satellite system (GNSS) receiver may make pseudorange, carrier measurements, and carrier phase measurements to compute a position and velocity of the receiver. The principal GNSS signal tracked by the receiver may be the line-of-sight (LOS) signal. However, multipath may occur when the GNSS signal is reflected off an object, for example, a wall of a building, to the GNSS receiver antenna. Since the reflected signal (also referred to as a non-line-of-sight (NLOS) signal) travels further than the LOS signal to reach the receiver's antenna, the NLOS signal arrives at the receiver slightly delayed. Multipath arises from the reception of such reflected signals, possibly in addition to a line-of-sight (LOS) signal, and may be one of the most significant error sources in GNSS positioning applications. In particular, multipath may be an important issue in an urban canyon environment (e.g., a GNSS receiver in between very high buildings).

Thus, there is a need for a system and method for multipath mitigation in global navigation satellite system receivers.

SUMMARY

According to an embodiment of the present invention, there is provided a method for multipath estimation, the method including: performing a first weight estimation operation for a first number of multipath components of a received correlation; calculating a remaining error energy by subtracting a sum of estimated multipath components from the received correlation; determining whether a satisfaction criterion is met for the remaining error energy in response to determining that the satisfaction criterion is not met: performing a second weight estimation operation for a second number of multipath components, the second number being greater than the first number; wherein the second weight estimation operation includes: subtracting, from the received correlation, first estimates of the multipath components except a first multipath component, to form a first residual correlation; estimating the first multipath component according to a delay and amplitude of a peak in the first residual correlation to form a second estimate of the first multipath component, subtracting from the received correlation the second estimate of the first multipath component, the first estimates of the multipath components except the first multipath component and a second multipath component, to form a second residual correlation; and estimating the second multipath component according to a delay and amplitude of a peak in the second residual correlation.

In some embodiments, the second weight estimation operation includes executing a loop P times unless a loop exit is performed, P being a positive integer equal to the second number of multipath components, a first and second execution of the loop including the estimating of the first multipath component and the estimating of the second multipath component.

In some embodiments, the second weight estimation operation further includes: subtracting from the received correlation the first estimates of the multipath components except the first multipath component and the second multipath component, to form a third residual correlation; determining whether an amplitude of a peak in the third residual correlation exceeds an error energy threshold; and in response to determining that the amplitude of the peak in the third residual correlation does not exceed the error energy threshold, performing a loop exit.

In some embodiments, the received correlation is the real part of a received complex correlation, the method further including performing an imaginary weight estimation operation for a first number of imaginary multipath components of an imaginary part of the received complex correlation.

In some embodiments, the received correlation is a correlation of a received global navigation satellite system signal.

In some embodiments, the method further includes processing a lowest-delay multipath component with a navigation engine.

In some embodiments, the method further includes processing a lowest-delay multipath component having an estimated amplitude exceeding a carrier phase tracking threshold with a carrier phase tracking circuit.

In some embodiments, the method further includes processing a multipath component having a largest estimated amplitude with a data decoding circuit.

In some embodiments, the satisfaction criterion is met when the remaining error energy is less than a set threshold.

In some embodiments, the method further includes: receiving a global navigation satellite system signal with a receiver having a bandwidth of at least 10 MHz, and forming the received correlation from the global navigation satellite system signal.

According to an embodiment of the present invention, there is provided a system for multipath estimation, the system including a processing circuit configured to: perform a first weight estimation operation for a first number of multipath components of a received correlation; calculate a remaining error energy by subtracting a sum of estimated multipath components from the received correlation; determine whether a satisfaction criterion is met for the remaining error energy in response to determining that the satisfaction criterion is not met: perform a second weight estimation operation for a second number of multipath components, the second number being greater than the first number; wherein the second weight estimation operation includes: subtracting, from the received correlation, first estimates of the multipath components except a first multipath component, to form a first residual correlation; estimating the first multipath component according to a delay and amplitude of a peak in the first residual correlation to form a second estimate of the first multipath component, subtracting from the received correlation the second estimate of the first multipath component, the first estimates of the multipath components except the first multipath component and a second multipath component, to form a second residual correlation; and estimating the second multipath component according to a delay and amplitude of a peak in the second residual correlation.

In some embodiments, the second weight estimation operation includes executing a loop P times unless a loop exit is performed, P being a positive integer equal to the second number of multipath components, a first and second execution of the loop including the estimating of the first multipath component and the estimating of the second multipath component.

In some embodiments, the second weight estimation operation further includes: subtracting from the received correlation the first estimates of the multipath components except the first multipath component and the second multipath component, to form a third residual correlation; determining whether an amplitude of a peak in the third residual correlation exceeds an error energy threshold; and in response to determining that the amplitude of the peak in the third residual correlation does not exceed the error energy threshold, performing a loop exit.

In some embodiments, the received correlation is the real part of a received complex correlation, the processing circuit being further configured to perform an imaginary weight estimation operation for a first number of imaginary multipath components of an imaginary part of the received complex correlation.

In some embodiments, the received correlation is a correlation of a received global navigation satellite system signal.

In some embodiments, the processing circuit is further configured to process a lowest-delay multipath component with a navigation engine.

In some embodiments, the processing circuit is further configured to process a lowest-delay multipath component having an estimated amplitude exceeding a carrier phase tracking threshold with a carrier phase tracking circuit.

In some embodiments, the processing circuit is further configured to process a multipath component having a largest estimated amplitude with a data decoding circuit.

In some embodiments, the satisfaction criterion is met when the remaining error energy is less than a set threshold.

In some embodiments, the system further includes a multiplexer configured to produce an output select from among: the received correlation; the received correlation, less one or more estimated multipath components; and the estimated multipath components.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for multipath mitigation in global navigation satellite system receivers provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
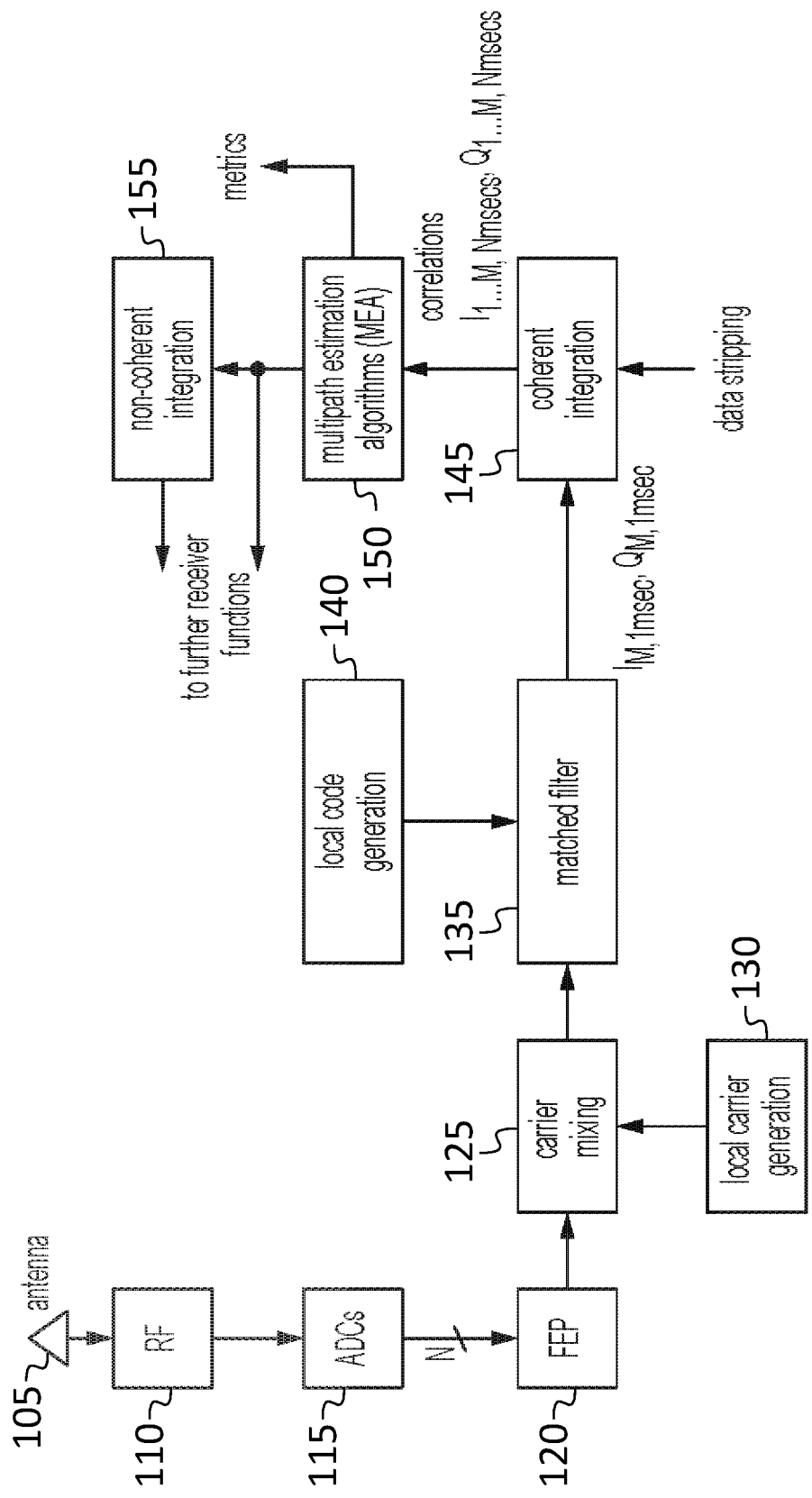
FIG. 1 is a block diagram of a GNSS receiver, according to an embodiment of the present disclosure.

FIG. 1 is a block diagram of a GNSS receiver. An antenna 105 feeds signals to a radio frequency front end 110, in turn connected to analog to digital converters 115, a front end processor 120, a carrier mixing circuit 125 (also fed by a local carrier generating circuit 130), a matched filter 135 (fed also by a local code generation circuit 140), a coherent integration circuit 145, a multipath estimation circuit 150, a non-coherent integration circuit 155, and circuits for performing other receiver functions, as shown.

In some embodiments, multipath estimation (e.g., estimation of the amplitude and delay of one or more of the LOS signal (if present) and of one or more NLOS signals) may be performed by the multipath estimation circuit 150, as described in further detail herein. A complex (I and Q) correlation window (or "received complex correlation") of, e.g., 160 taps×100 milliseconds ("msecs" or "ms") may be created. In embodiments in which the multipath estimation circuit 150 is absent the correlation window may be fed directly into other receiver functions, for example data decode, code and carrier tracking, and impairment metrics. In some embodiments the correlation window is first fed into the multipath estimation circuit 150 as shown in FIG. 1. The multipath estimation circuit 150 may estimate multipath parameters of the incoming signal such that further receiver functions can operate on a multipath mitigated complex correlation window. Each multipath component is characterized by amplitude (A) phase (θ) and delay (τ).

Data stripping may allow the coherent integration process to extend beyond a data bit. Data bits may be known via a number of sources, including known secondary codes in modern pilot signals. The multipath estimation circuit 150 may output a multipath mitigated correlation window and several other metrics. The modified correlation window may be passed on to circuits for performing other receiver functions, as shown in FIG. 1.

The received signal may be modeled as a linear combination of LOS and NLOS signals. For example, an incoming signal may be Galileo E1-C, and a coherent integration period may be 100 msec. Some embodiments may use coherent integration as an input to the multipath estimation circuit 150.

Figure 2:
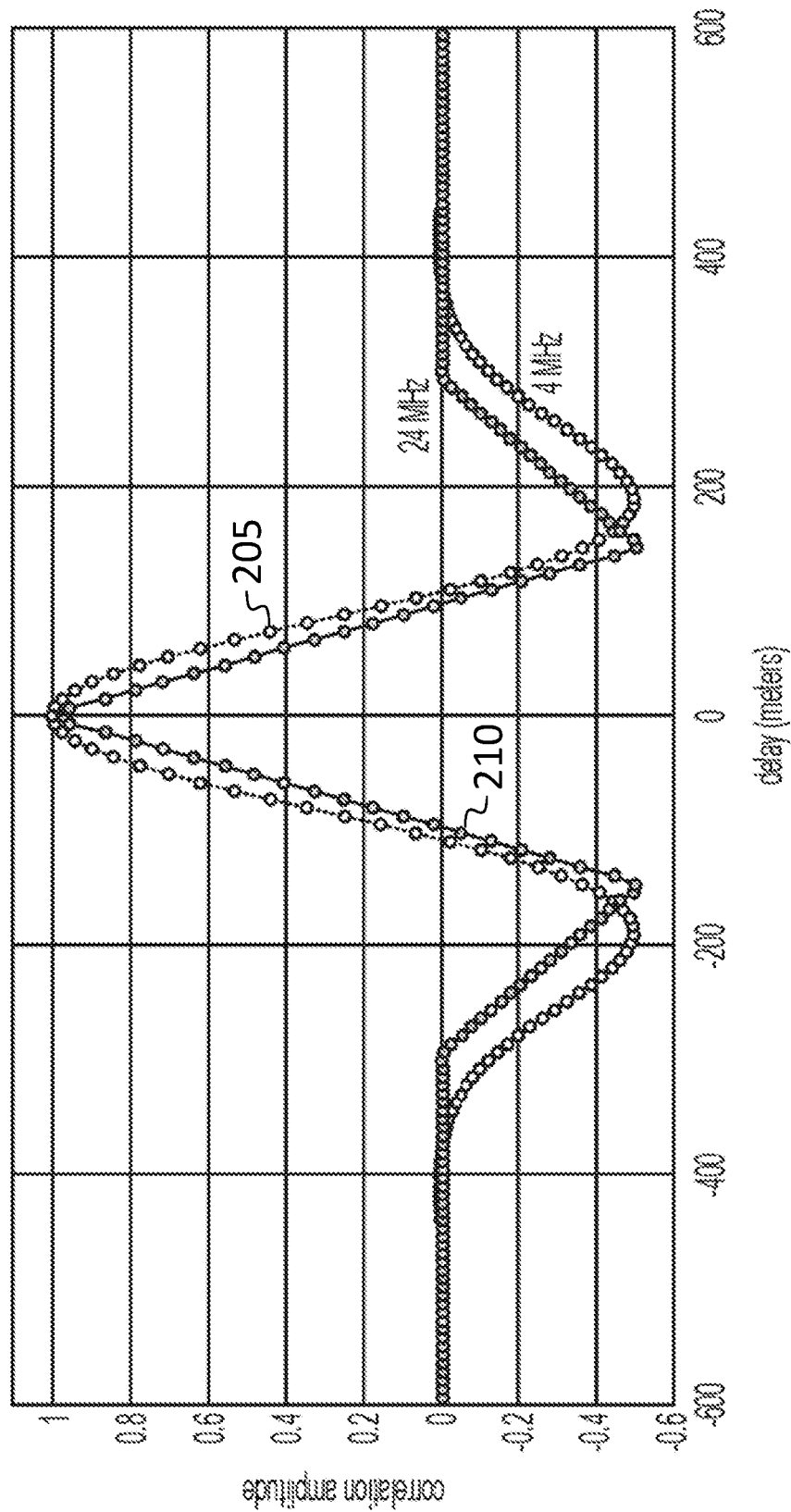
FIG. 2 is a graph of a correlation, according to an embodiment of the present disclosure.

Some GNSS satellites transmit signals with significantly wider bandwidth (e.g., 24 MHz for a Galileo E1-C signal) than the receiver bandwidth of some GNSS receivers (e.g., 4 MHz). In some embodiments, increased receive bandwidth is used to improve the estimation of multipath components. FIG. 2 shows an example of coherent integration output for a LOS signal, at a received bandwidth of 4 MHz (for a first curve 205) and 24 MHz (for a second curve 210). Either of the signals of FIG. 2 may also be referred to as a "reference correlation". FIG. 2 shows the nominal correlation function without any impairments (e.g. without noise or multipath), for the two receiver bandwidths (24 MHz and 4 MHz). The reference correlation may be used as the waveform (after scaling and delay are applied) that is subtracted from the incoming signal (as discussed in further detail below). If only a LOS signal is received, it may be expected that subtraction by the reference correlation will lead to no remaining correlation window signal energy, assuming the received signal parameters are accurately estimated.

Each received signal component (either LOS or NLOS) may be modelled as follows:

$$S_k = A_k e^{-j[\theta(k)+\tau(k)]},$$

where $A_k$ is the $k^{th}$ component's amplitude (with the LOS component being designated k=0), θ is phase delay, and τ is delay. In a one LOS and one NLOS scenario the received signal is given by:

$$S = S_0 + S_1 = A_0 e^{-j[\theta(0)+\tau(0)]} + A_1 e^{-j[\theta(1)+\tau(1)]}$$

Figure 3A:
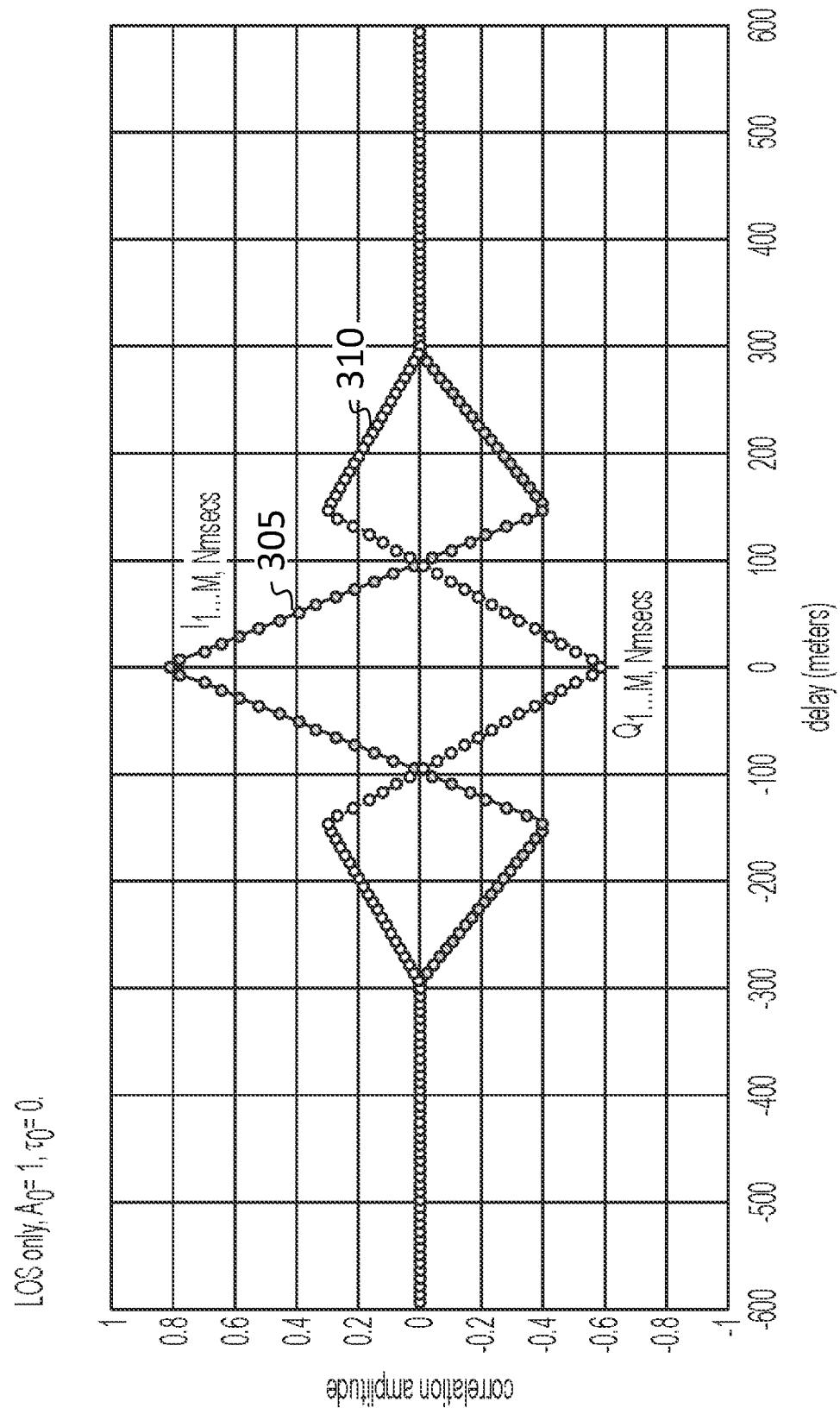
FIG. 3A is a graph of real and imaginary parts of a complex correlation, according to an embodiment of the present disclosure.
Figure 3B:
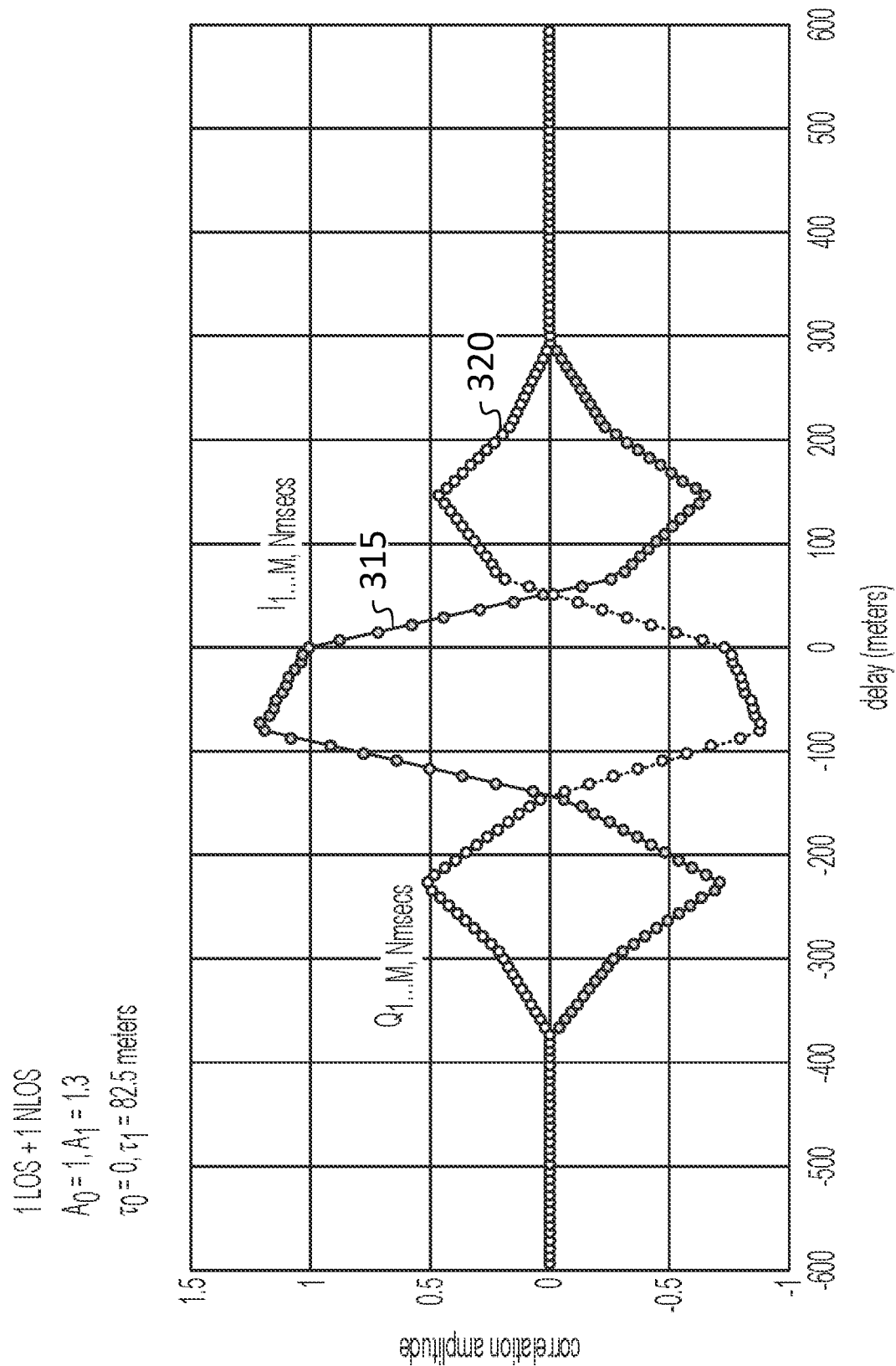
FIG. 3B is a graph of real and imaginary parts of a complex correlation, according to an embodiment of the present disclosure.
Figure 3C:
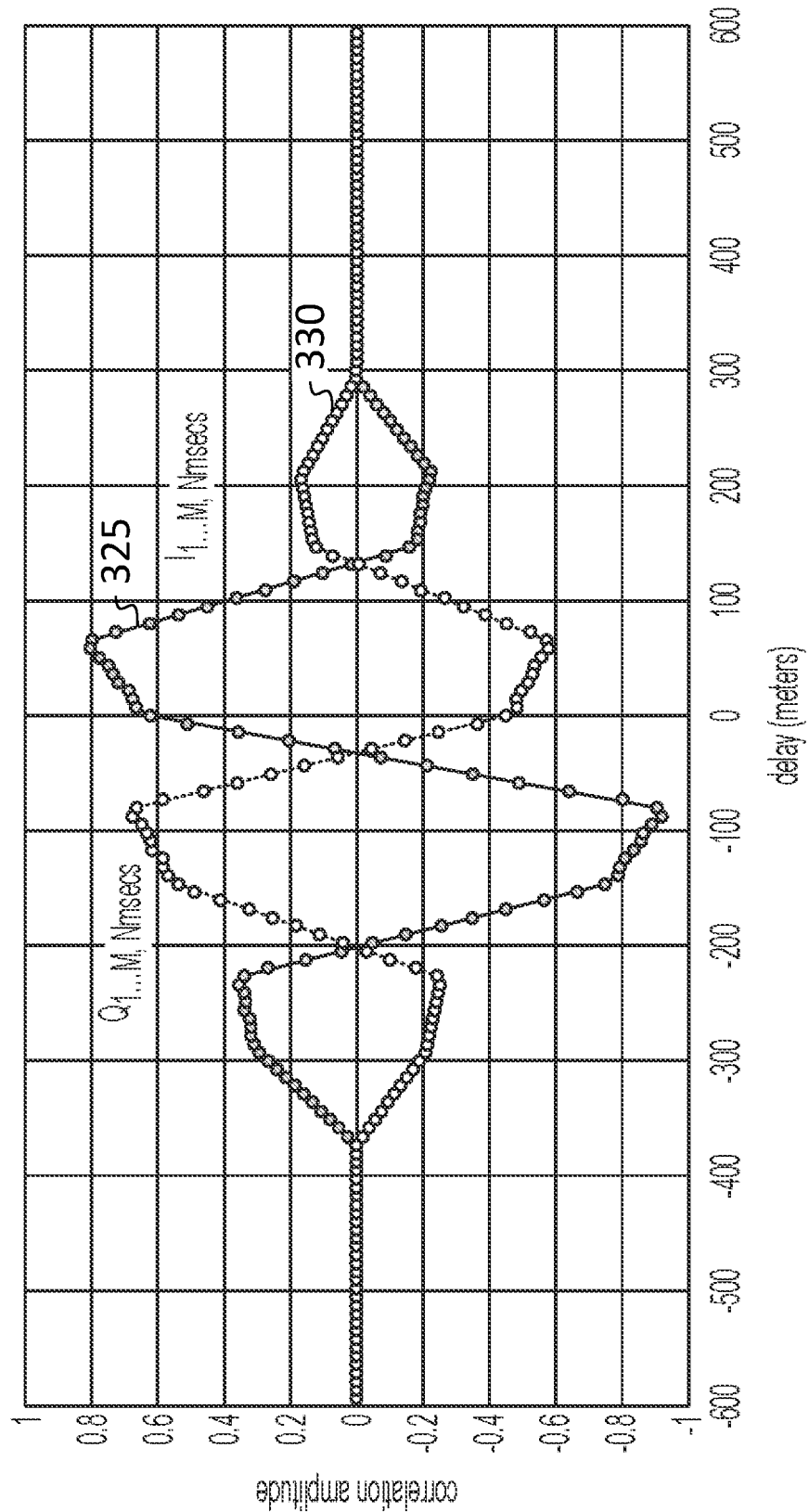
FIG. 3C is a graph of real and imaginary parts of a complex correlation, according to an embodiment of the present disclosure.

FIG. 3A illustrates an exemplary plot of I (at 305) and Q (at 310) received correlations (or "correlation windows") for LOS only, according to one embodiment. FIG. 3B illustrates an exemplary plot of I (at 315) and Q (at 320) correlation windows for constructive multipath (having one LOS and one NLOS), according to one embodiment. FIG. 3C illustrates an exemplary plot of I (at 325) and Q (at 330) correlation windows for destructive multipath (having one LOS and one NLOS), according to one embodiment. In the cases of constructive and destructive multipath, it may be seen that the amplitude of the received correlation at a delay value of zero is greater, or less, respectively, than the amplitude of the reference correlation at a delay of zero.

From FIGS. 3A-3C it may be seen that measuring the peak of the received correlation S (which may be the real part of a received complex correlation or the imaginary part of a received complex correlation) may not provide an accurate representation of the strongest (e.g., largest-amplitude) component in the received correlation. In the case of a LOS signal only being present, subtracting a scaled reference from S in principle should lead to complete cancellation of signal energy at all delay offsets, as mentioned above. It may be seen from FIGS. 3B and 3C that this may not be the case when both one LOS signal and one NLOS signal are present (and in other scenarios where more than one signal component is present). As used herein, a "peak" of a correlation (e.g., of the real part of a received complex correlation or of the imaginary part of a received complex correlation) is a point at which the amplitude of the correlation has the largest absolute value.

In some embodiments, the method for multipath estimation and mitigation involves making one or more attempts to approximate (or model) a received correlation as a combination of one or more components (line of sight or non-line of sight components). The method may involve first attempting to approximate the received correlation as being a single component, and then, if the approximation does not satisfy a satisfaction criterion, iteratively attempting to approximate the received correlation as being a combination of a successively larger number of components, (e.g., two components, three components, and so on) until an approximation results that satisfies the satisfaction criterion. Each attempt may involve iteratively estimating the amplitude and delay of each component. The estimating of any component may involve finding a peak in a residual correlation function, the residual correlation function being calculated by subtracting from (i) the received correlation (ii) estimates of any components (except the one being estimated) that have already been estimated. Once the peak is found, the estimated delay of the component may be set equal to the delay of the peak, and the estimate amplitude of the component may be set equal to the ratio of (i) the amplitude of the peak to (ii) a peak amplitude of a reference correlation. The estimated component may then be the product of the weight (or estimated amplitude) and the reference correlation, shifted by the estimated delay.

Figure 4A:
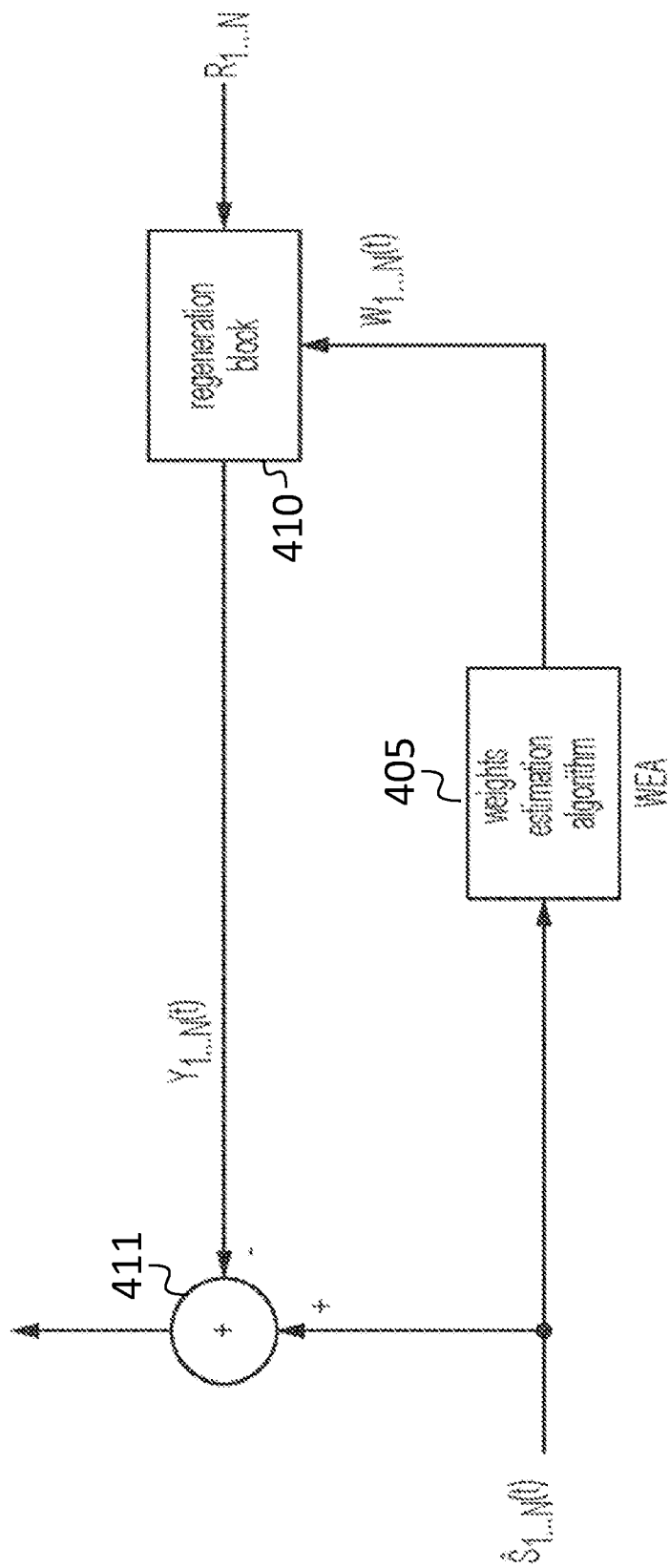
FIG. 4A is a block diagram of a portion of a system for multipath estimation and mitigation, according to an embodiment of the present disclosure.

FIG. 4A is a block diagram corresponding to a portion of a system for multipath estimation and mitigation. The received correlation (or "incoming signal") ($\hat{S}$) is passed to a weight estimation circuit 405 (or to an analogous "weights estimation algorithm") (FIG. 1) which looks for a signal peak and estimates the signal parameters based on this peak (in I and Q independently). The multipath estimation circuit 150 then reconstructs its signal estimate (S) (in a regeneration circuit 410 or "regeneration block", which calculates $S_{1...N}(t) = W_{1...N}(t) \times R_{1...N}$) and subtracts (in the subtraction circuit 411) the reconstructed or "regenerated" signal from the incoming signal to form an error signal e (where $e_{1...N}(t) = \hat{Y}_{1...N}(t) - Y_{1...N}(t)$).

This error signal is a metric of the quality of the signal reconstruction. It can be used to end the looping of successive subtractions. In FIG. 4A, the incoming signal is $S_{total} = \hat{Y}_{1...N}(t)$. 1 . . . N is the N tap window, N being about 160 for a sampling rate of 40 fx. The frequency fx in a receiver may be 1.0230625 MHz, for example. The basic spreading code rate for some GPS and GAL signals is fo=1.023 MHz. A difference between fx and fo is immaterial to the operation of some embodiments. Different embodiments of receivers will use different sampling rates and correlation tap spacing. The wider the signal bandwidth of the signal in the receiver the higher the sampling rate that may be employed (e.g., sampling may be performed at the Nyquist rate) to avoid loss of signal through aliasing. In some embodiments values other than 160 for N, and other than 40fx for the sampling rate, are used. In some embodiments, the receiver bandwidth is 20 MHz (towards the wider bandwidth options), and the sampling rate of 40fx (approx. 41 MHz) exceeds the Nyquist sampling rate. The correlator window is then made up of a number of such approximately ¹⁄₄₀th chip separated correlations (160 being equal to 4 chips at ¹⁄₄₀th chip separation). This may be chosen such that the correlation window contains the maximum expected multipath delay. The nominal correlation window may be a function that is +/−1 chip wide (see FIG. 2). Two additional chips may be added to accommodate approximately 600 meters of delayed multipath (each chip is approximately 300 meters). These are only examples; higher bandwidths, higher sampling rates, and wider correlation windows may lead to improved performance, in some embodiments.

Weights are given by $W_{1...N}(t)$. Weights are only non-zero for the peak position of the component estimate. The reference signal is given by $R_{1...N}$. $S_{1...N}(t) = W_{1...N}(t) \times R_{1...N}$ and represents a reconstruction of the received correlation from the discovered weights. $e_{1...N}(t) = \hat{S}_{1...N}(t) - S_{1...N}(t)$ represents the remaining error energy, which may be a measure of how well the developed model matches the incoming signal. $F_{est} = (1/N) \Sigma\, e_{1...N}(t)^2$ is a "satisfaction" metric of model match. Portions of the method for multipath estimation and mitigation may be repeated until a satisfaction criterion is met, e.g., until the satisfaction metric is less than a set error energy threshold.

Figure 4B:
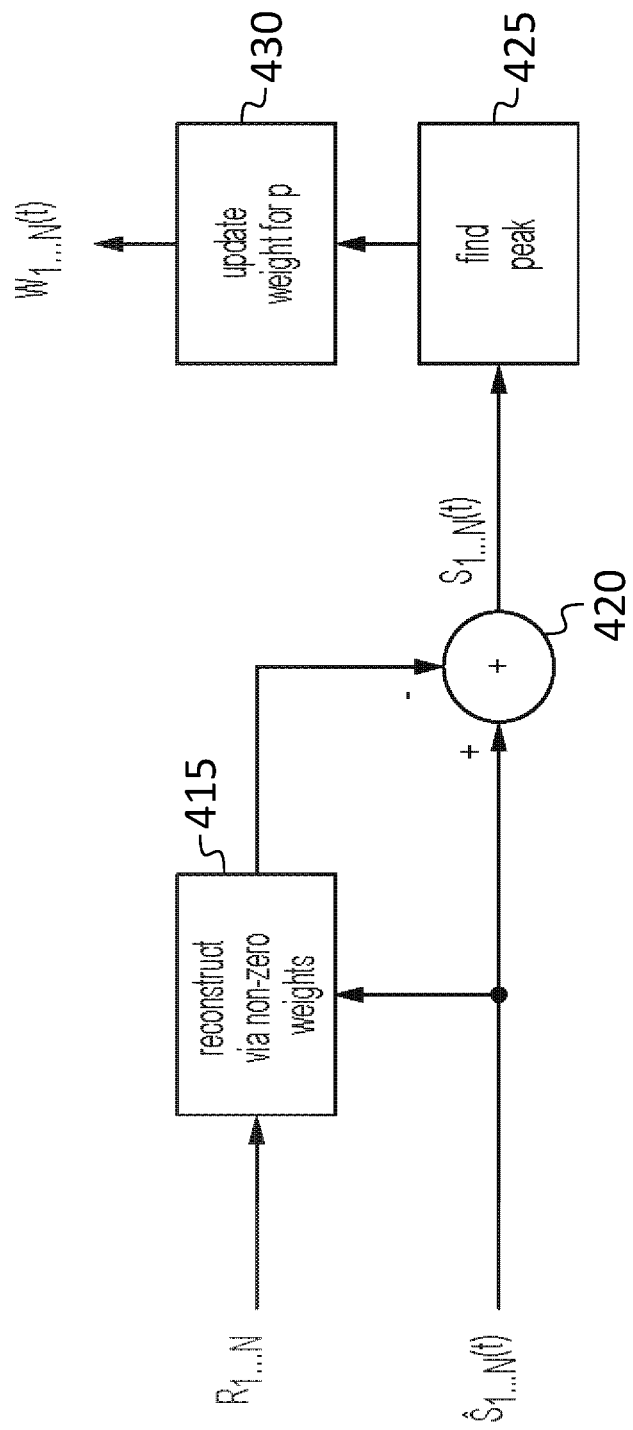
FIG. 4B is a block diagram of a portion of a system for multipath estimation and mitigation, according to an embodiment of the present disclosure.

FIG. 4B is a block diagram of the weight estimation circuit 405. A signal that is reconstructed, in a partial signal reconstruction circuit 415, from all of the components except the one being estimated, is formed and is subtracted, in a subtraction circuit 420, from the received correlation. A peak is found, in a peak finding circuit 425, and the weight and delay for the component being estimated is updated in a weight updating circuit 430. In some embodiments, the estimating of components may be repeated several times for a fixed number (P) of components, each iteration using, when estimating one component, an updated set of estimates for the other components that were updated during the previous iteration. In some embodiments, the weights estimation algorithm generates the number P of multipath components found. The weights estimation algorithm may run an iterative algorithm (in an inner loop, discussed in further detail below, in the context of FIG. 5). The weights estimation algorithm may be the only place that P is changed, based on the remaining energy left. The method for multipath estimation may use P but the value of P (and the weights, etc.) may be determined by the weights estimation algorithm.

Because each iteration uses updated (and therefore, potentially different) component estimates, it is possible for a multipath component to be estimated during one iteration only to be lost (i.e., to have an estimated amplitude falling below an amplitude threshold, resulting in it being deemed a non-detection) during a subsequent iteration. Alternatively it is possible for a new multipath component to be detected (i.e., to have an estimated amplitude exceeding the amplitude threshold) in a later iteration that was not detected in earlier iterations.

For example, for P=2, after the 1$^{st}$ peak is estimated and a reconstructed signal (or "scaled reference") based on it is subtracted, the operation is repeated for any remaining energy. If a second peak found has enough energy (detected via threshold comparison), another scaled reference is subtracted. This process is repeated until no remaining energy is detected. After two peaks, for example, have been found, the process is repeated but this time the estimated second component is subtracted from the received correlation before an updated estimate of the first component is made. Similarly, the most recently estimated first component is subtracted from the received correlation before an updated estimate of the second component is made. The process may be carried out independently in I and Q channels, e.g., independently for the real part and for the imaginary part of a received complex correlation.

In some embodiments, receivers form a signal magnitude estimate via $\sqrt{I^2+Q^2}$; the reason this may not be used for multipath estimation is that it destroys phase information and hence may not be suitable for measuring the impact of multipath. Hence I and Q (as described above) may be processed independently to provide essentially two different multipath estimates. For example it may be found that P=3 in the I arm and P=2 in the Q arm, and that the amplitudes of P=1 and P=2 components are different between I and Q arms. Such a result is plausible given that the phase of LOS and NLOS components are capable of independently rotating with respect to each other. As such, in some embodiments, I and Q signals are 90 degrees apart and a multipath component with high amplitude in Q (e.g., a P=2 component) may have low amplitude in the I arm, but the knowledge of P=2 in the Q arm may be transferred to the I arm (via a 90 degree shift). In such an embodiment the I and Q arms may share their respective multipath component findings; if P=2 has higher amplitude in the Q arm then this value can be substituted into the I arm, replacing the I arm's own estimate. After the I and Q arm P components have been ascertained, each individual P component's signal power may be estimated via ($I^2+Q^2$). This may provide a signal power metric useful in determining its impact on further receiver algorithms.

Figure 5:
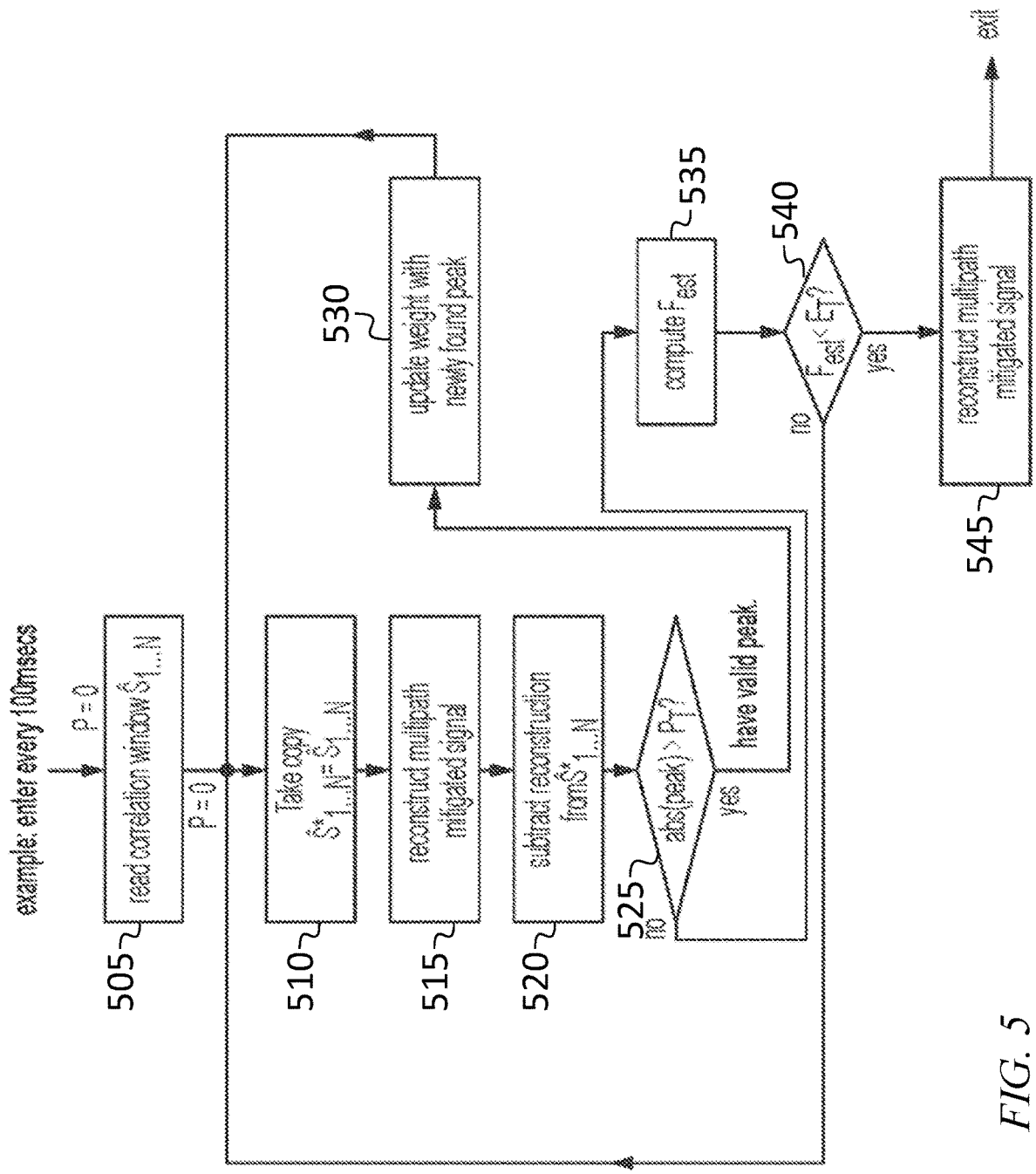
FIG. 5 is a flow chart of a method for multipath estimation and mitigation, according to an embodiment of the present disclosure.

FIG. 5 shows a flow chart for a method for multipath estimation and mitigation. A received correlation (or "correlation window") is read at 505. Acts 510-530 form an inner loop, and, acts 510-540 form an outer loop. A copy is made at 510, and a multipath mitigated signal is constructed at 515. The multipath mitigated signal is subtracted, at 520, from the copy, and the peak value in the difference is compared, at 525, to the amplitude threshold $P_T$. If the peak value in the difference is less than the amplitude threshold, a loop exit is performed, exiting from the inner loop. Otherwise, the weight of the component being estimated is updated, at 530, according to the newly found peak, and, at 535, the remaining error energy is calculated. If, at 540, the remaining error energy is less than an error energy threshold the outer loop terminates; otherwise it repeats.

For example, as illustrated in FIG. 5, the method for multipath estimation and mitigation may include performing a first weight estimation operation for a first number of multipath components (e.g., for two multipath components) of the received correlation (e.g., a first iteration of the outer loop may be performed with the inner loop estimating the respective amplitudes and delays of two multipath components (i.e., P=2)). The method may further include calculating a remaining error energy by subtracting a sum of estimated multipath components from the received correlation (as is done at 535), and determining whether a satisfaction criterion is met for the remaining error energy (as is done at 540). In response to determining that the satisfaction criterion is not met, the method may include performing a second weight estimation operation for a second number of multipath components (e.g., for three multipath components (P=3), the second number being greater than the first number). Each of the weight estimation operations (e.g., the second weight estimation operation) may include (i) subtracting (at 520, on a first iteration of the inner loop), from the received correlation, first estimates of all of the multipath components except one (e.g., a first multipath component), to form a first residual correlation, (ii) estimating (at 530) the first multipath component according to a delay and amplitude of a peak in the first residual correlation, to form a second estimate of the first multipath component, (iii) subtracting (at 520, on the next iteration of the inner loop) from the received correlation (a) the second estimate of the first multipath component and (b) the first estimates of the multipath components except the first multipath component and a second multipath component, to form a second residual correlation; and (iv) estimating (at 530) the second multipath component according to a delay and amplitude of a peak in the second residual correlation.

Once the outer loop has terminated, a multipath mitigated signal is constructed at 545, e.g., by subtracting all of the estimated multipath components except one from the received correlation. The remaining multipath component may then be the multipath mitigated signal; it may be the lowest-delay multipath component (for example), or the largest amplitude signal, or a signal chosen based on other criteria (as discussed in further detail below). In some embodiments, more than one multipath mitigated signal may be formed.

Figure 6A:
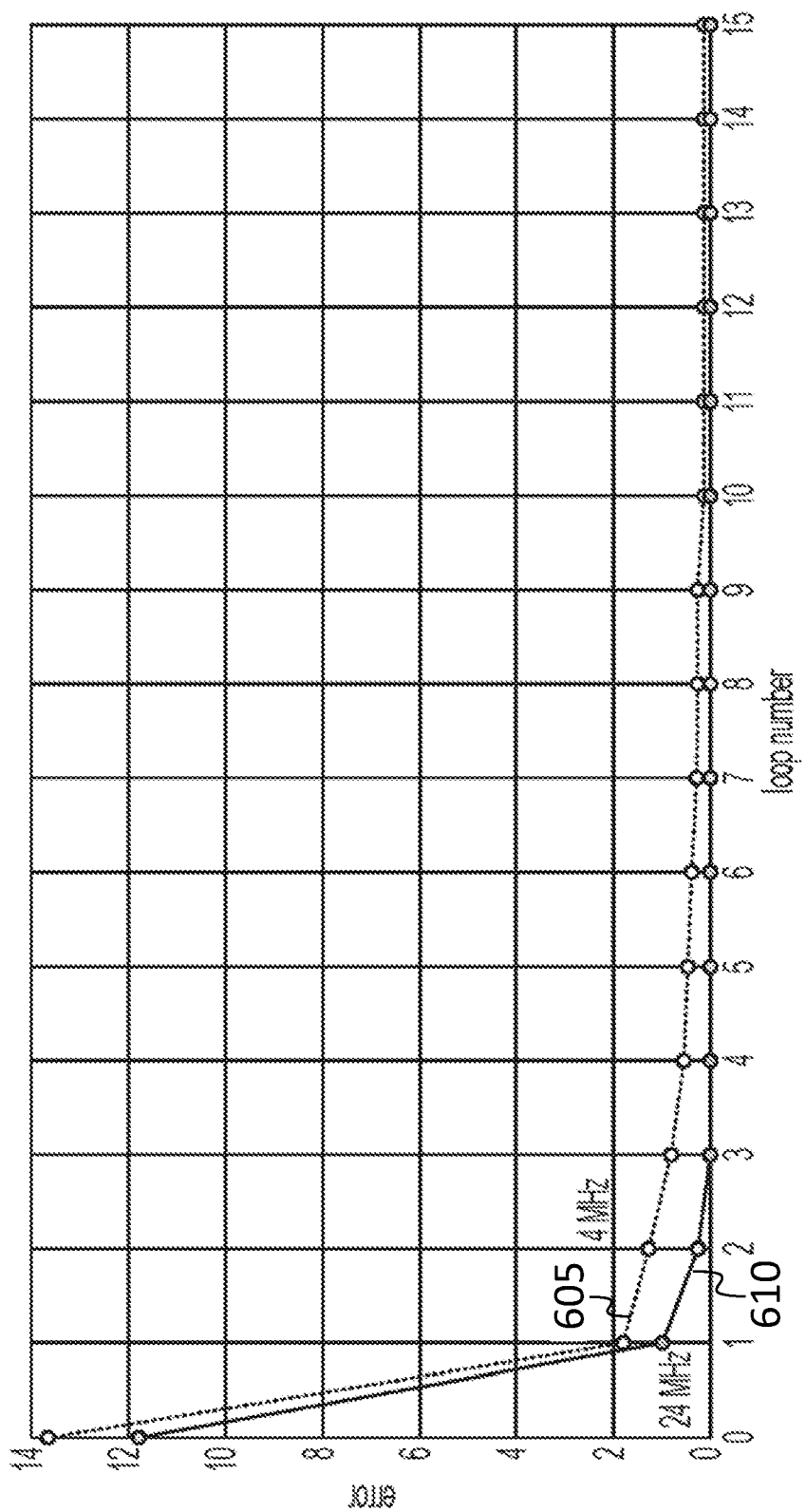
FIG. 6A is a graph of error as a function of a number of loop iterations, according to an embodiment of the present disclosure.
Figure 6B:
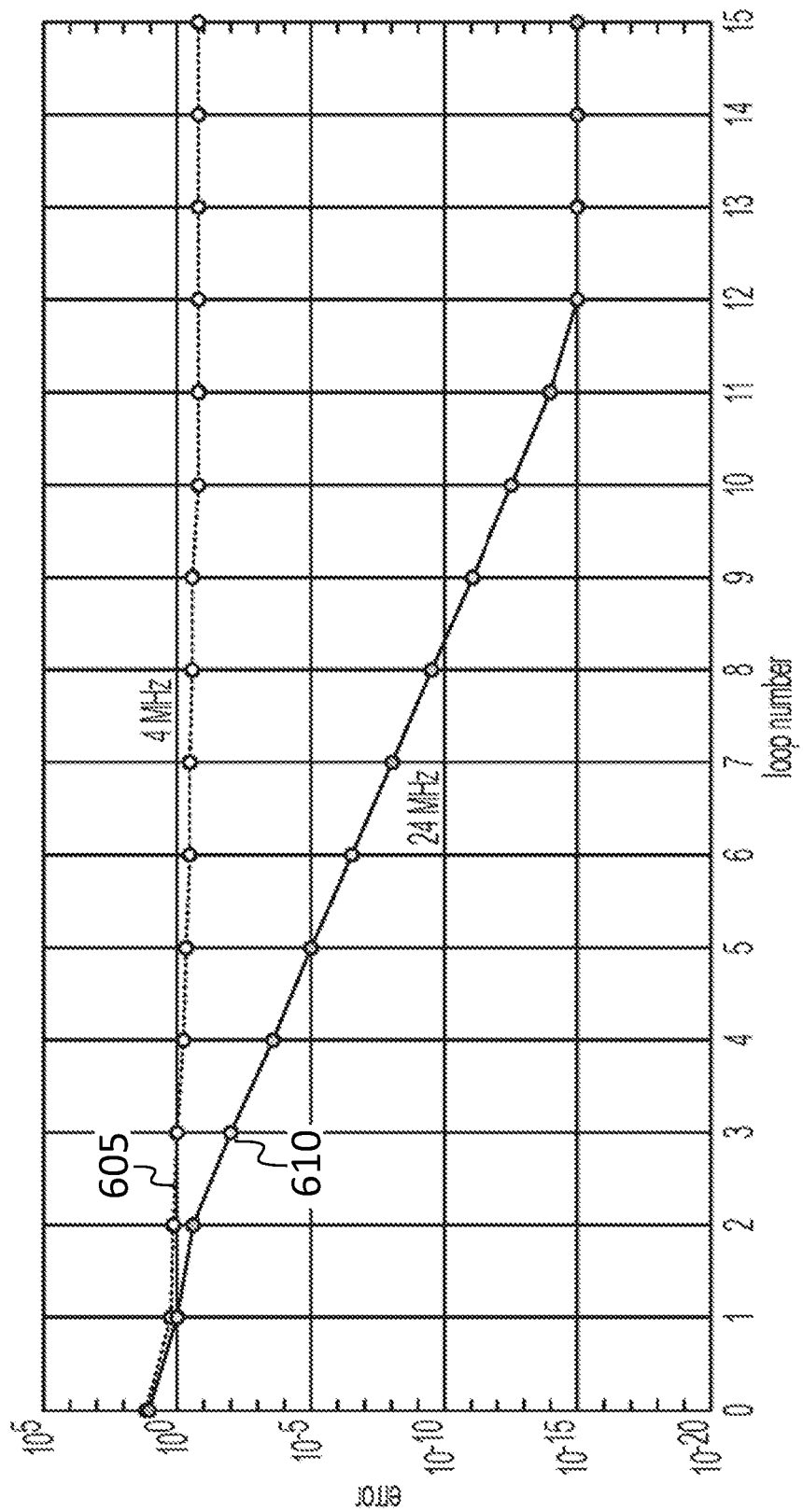
FIG. 6B is a graph of error as a function of a number of loop iterations, according to an embodiment of the present disclosure.

FIG. 6A shows the simulated error ($F_{est}$, on a linear scale) as a function of the number of iterations of the inner loop, for narrowband (4 MHz) (at 605) and wideband (24 MHz) (at 610) receiver bandwidths. A single loop looks for P multipath components using a single correlation window (in the simulation of FIG. 6A, P=2). It may be seen that using a wideband receiver bandwidth can lead to improved performance. In FIG. 6A, loop number=0 represents the error before any estimation is done. FIG. 6B shows the same result as FIG. 6A, but with the vertical axis having a logarithmic scale. The performance advantage of using a wider receiver bandwidth are more readily apparent in FIG. 6B than in FIG. 6A.

Figure 6C:
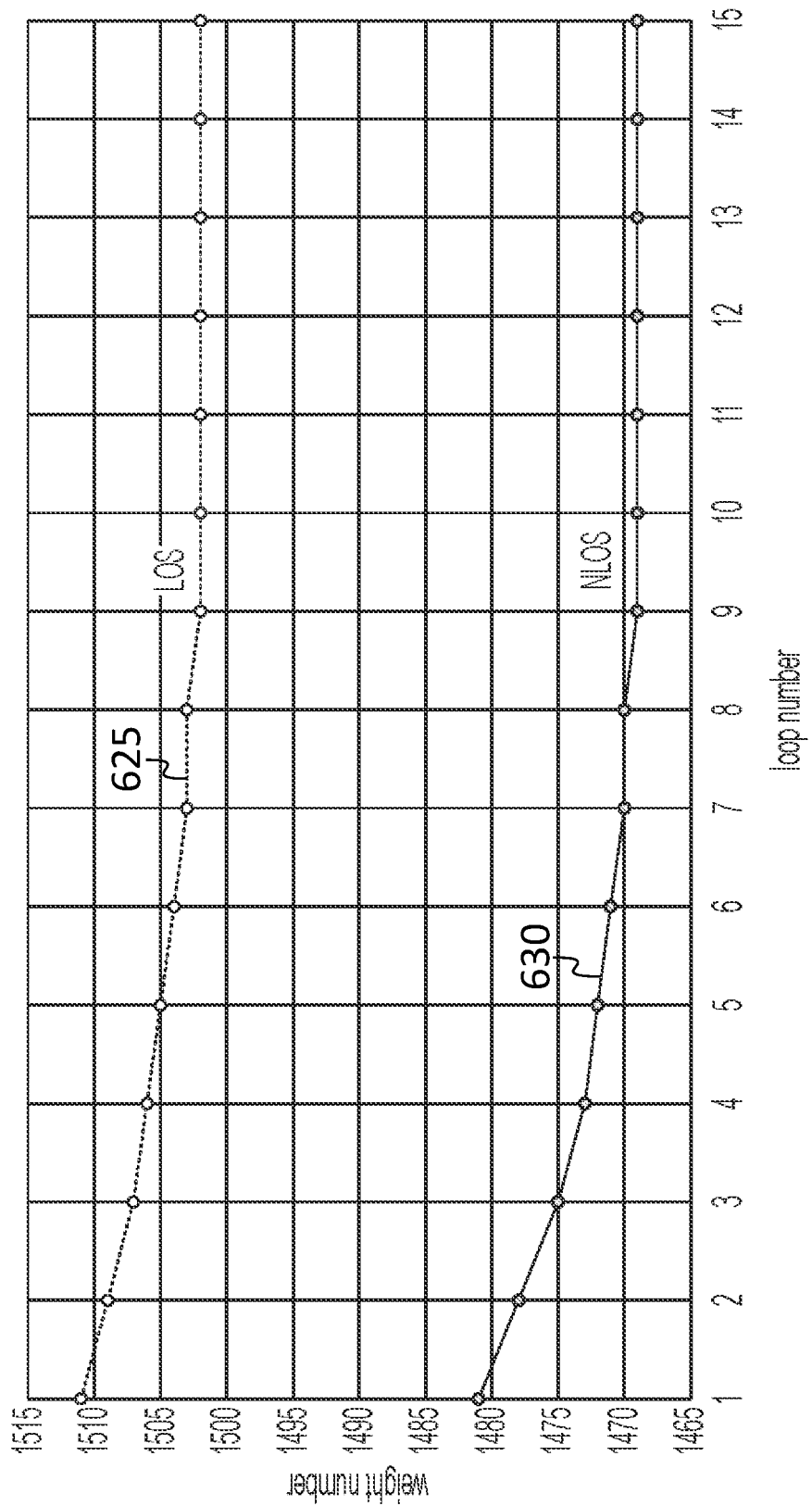
FIG. 6C is a graph of estimated component delay as a function of a number of loop iterations, according to an embodiment of the present disclosure.
Figure 6D:
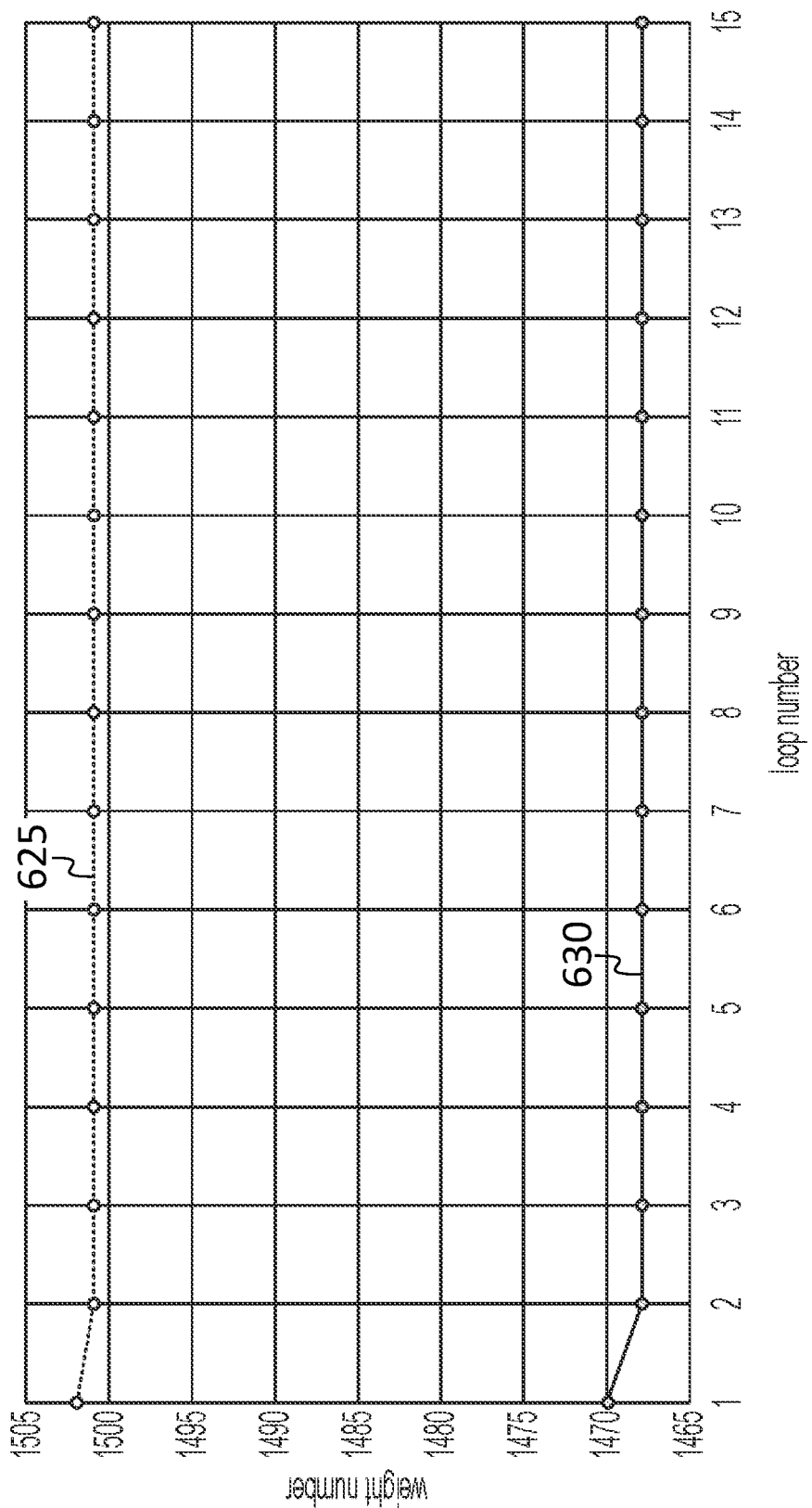
FIG. 6D is a graph of estimated component delay as a function of a number of loop iterations, according to an embodiment of the present disclosure.
Figure 6E:
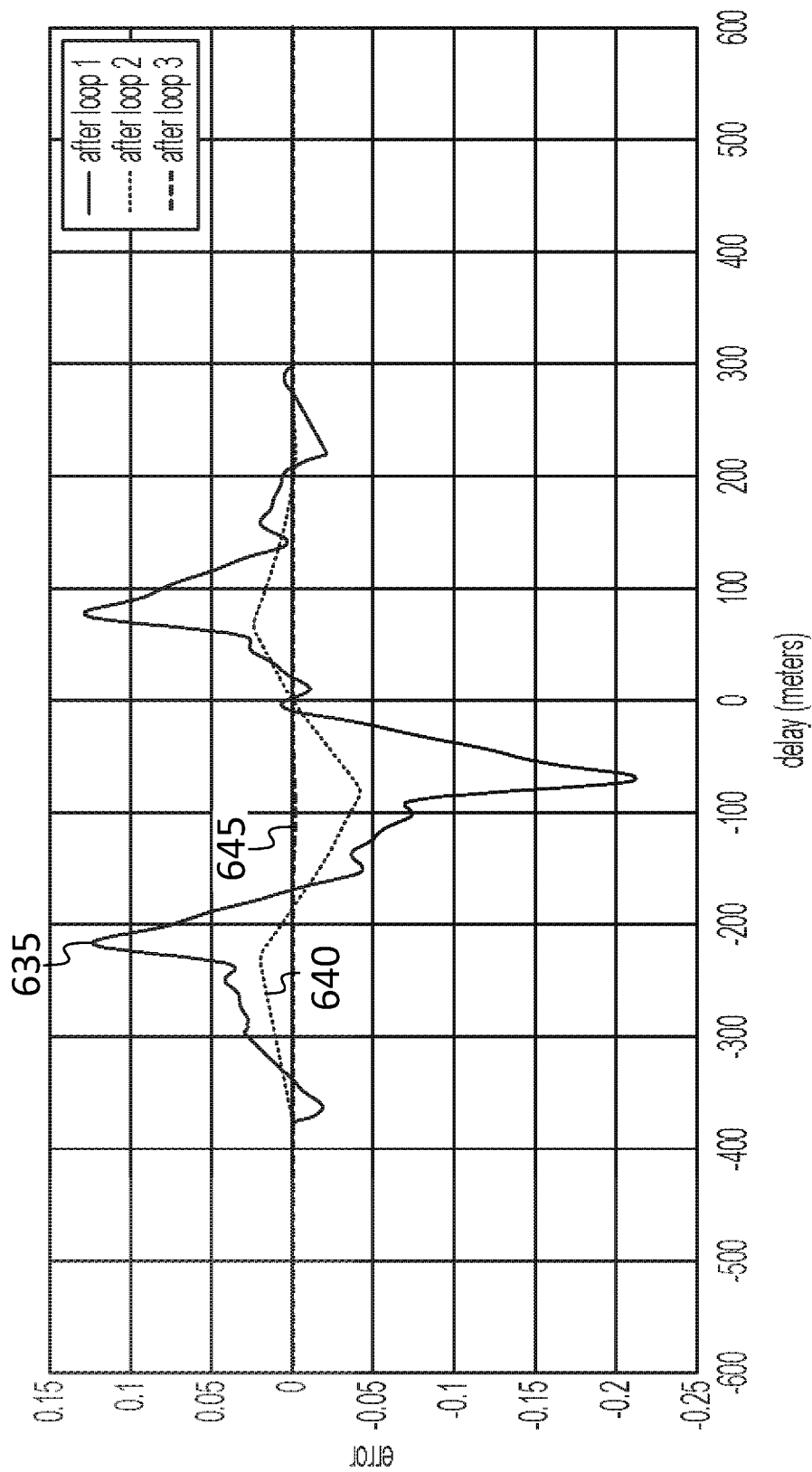
FIG. 6E is a graph of remaining error, according to an embodiment of the present disclosure.

FIG. 6C is a graph of weight variability, for a simulation of a receiver with a bandwidth of 4 MHz, for a simulation with P multipath components (in the simulation of FIG. 6C, P=2, with one LOS component (at 625) and one NLOS component (at 630)) It may be seen that the position (delay) estimates of the components weights may vary with each iteration of the inner loop. FIG. 6D is similar to FIG. 6C, except that in the simulation used to generate FIG. 6D, a receiver bandwidth of 24 MHz was assumed. It may be seen from FIG. 6D that when a wide band receiver is used, initial peak estimates are improved (compared to the narrowband case) and therefore there is less delay change with each iteration of the inner loop. FIG. 6E shows remaining error ($F_{est}$) for iterations 1 (at 635), 2 (at 640) and 3 (at 645) of the inner loop.

Figure 7:
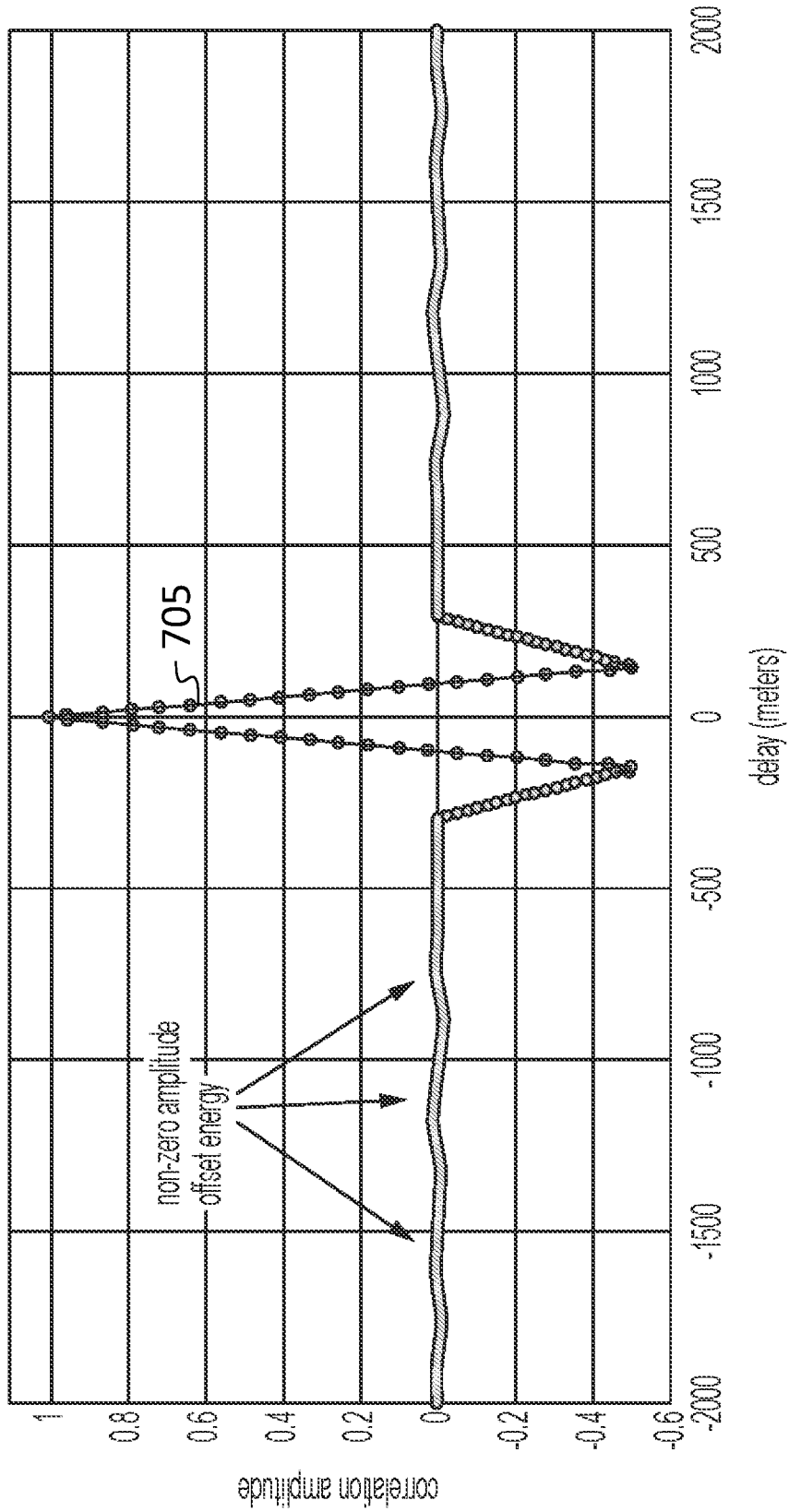
FIG. 7 is a graph of a reference correlation, according to an embodiment of the present disclosure.

FIG. 7 is a detailed graph of a reference correlation (at 705), which includes autocorrelation sidelobe energy. When represented in the reference correlation waveform a particular satellite signal's unique autocorrelation properties may be accounted for (e.g., included in the signal estimation). In this case there may be a unique reference correlation per satellite per signal. For Galileo E1-C, for example, there are 50 possible reference correlation waveforms. The use of such a satellite-specific reference correlation, instead of, e.g., the more generic reference correlation of FIG. 2, may improve the performance of the system.

The multipath environment of a GNSS receiver may change with time, as the receiver and the satellites (and possibly some obstructions and source of reflections) move. As such, multipath estimation and mitigation may be performed periodically, e.g., every 100 ms. When multipath estimation and mitigation has already been performed recently (e.g., 100 ms previously), the previously obtained estimated component weights and delays may be used as initial values for a subsequent multipath estimation operation. If carrier phase lock is available, coherent integration can be extended to improve the signal to noise ratio into the multipath estimation and weight estimation algorithms.

In some embodiments, the estimated weights are filtered across 100 ms periods. For example a low pass filter may use 100 ms weight updates as the input and filter with an effective bandwidth of 1 second. This may allow a reduction of noise in the multipath component estimates.

Figure 8:
FIG. 8 is a block diagram for multipath component distribution, according to an embodiment of the present disclosure.

FIG. 8 illustrates an exemplary block diagram for multipath component distribution, according to one embodiment. The multipath estimation process may generate multiple multipath components as output. I and Q correlations are processed separately. The output of the multipath estimation circuit 150 may provide an estimate of data bits by allowing a Rake type function to combine the output signals of the multipath estimation circuit 150. As will be understood by those of skill in the art, Rake is a communications algorithm that combines different delayed paths to enhance a particular metric (usually BER, bit error rate, of data received in a communication system). For example, if there are 2 multipath components that are equal amplitude but delayed 2 chips with respect to each other, and the phase difference between the two components is 180 degrees, then simply adding the two components (after a delay shift) may result in their cancelling each other out, producing a result that is not helpful. If instead one component is rotated by 180 degrees before adding, a BER advantage may be realized.

GNSS has a data pattern (for GPS it's 50 bps, bits per second), for GAL 250 bps. Some embodiments allow the multipath components to be sensed independently such that the Rake algorithm described above is possible. GNSS is primarily a range measurement system so using some embodiments to determine the earliest arriving signal energy may be the primary function (in a GNSS system operating in a cell phone, for example, data may be transmitted to the cellphone via the cell phone network, such that direct decoding of satellite data is not always required).

Various components that may be isolated by the multipath estimation circuit 150 (e.g., from which other components in the signal may be subtracted, leaving only one component) may be employed for different purposes. For example, the earliest arriving (lowest-delay) component having nonzero amplitude may represent the best estimate of the time of arrival of the LOS.

If only one component is found, the receiver may use multipath identification bypass mode, i.e., the received correlation may be forwarded without modification to the circuits for performing other receiver functions. In some embodiments there is a bypass mode and there may be a mode that does not pass on the original correlation window but passes on the estimated correlation window, in other words passes on the reconstructed correlation window instead of the original. This may have the effect of extracting a best estimate of the correlation waveform, even for the P=1 case. This may be a switchable mode based on the amplitude of the signal observed.

The earliest arriving component that has CNO (the carrier to noise ratio over one second) exceeding a suitable carrier threshold (e.g., sufficient for tracking), may be the best candidate for LOS, and may be sent to tracking loops (e.g., DLL, AFC, PLL). The earliest arriving component that has CNO<threshold may be a false alarm. Range and range rate may be estimated for this component and sent to a navigation engine for further processing. The next earliest arriving component that has CNO exceeding the carrier threshold may then be sent to the tracking loops. The earliest arriving component that has a CNO exceeding the carrier phase tracking threshold may be used for carrier phase tracking; the corresponding I and Q outputs may be sent to a carrier phase tracking circuit. The strongest CNO component may be sent to a data decoding circuit. The use of the component with the greatest CNO may be advantageous as multiple components may interfere with each other in the data decode process.

Figure 9A:
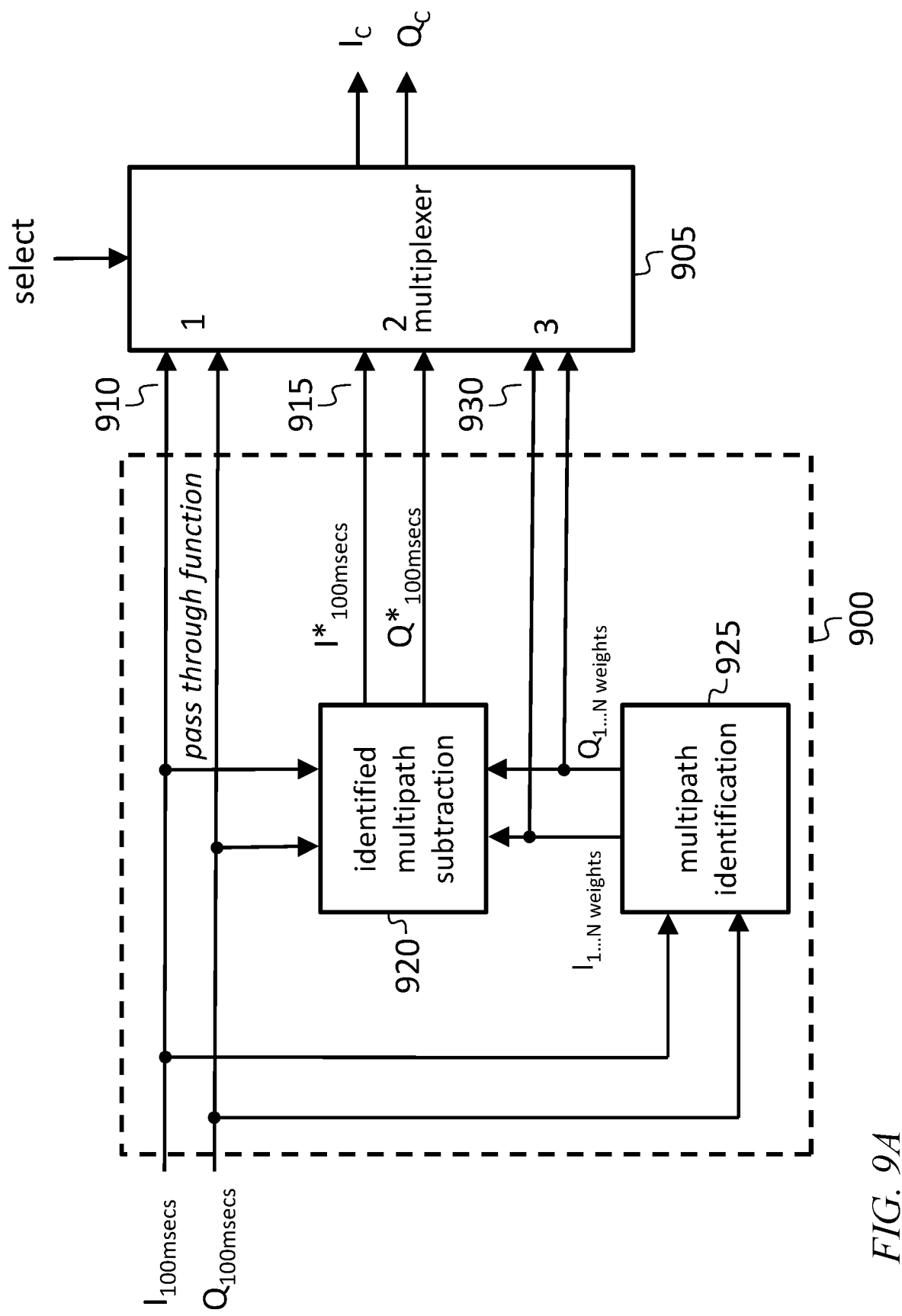
FIG. 9A is a block diagram of correlation choices, according to an embodiment of the present disclosure.

FIG. 9A shows basic correlation choices available (from a signal processing and combining circuit 900) in some embodiments. A multiplexer 905 on the output of FIG. 9 allows the choice of several options as follows. A first input 910 of the multiplexer passes the input to output unaltered. A second input 915 of the multiplexer subtracts (in a subtraction circuit 920) one or more identified (and reconstructed) multipath components (formed in an identification and reconstruction circuit 925) from the input, before applying the result to the output. A third input 930 of the multiplexer passes one or more of the identified multipath components to the output. The third output 950 (FIG. 9B) of the signal processing and combining circuit 900 of the multiplexer may be a pure model-based output in the sense that it is not a direct function of the input correlator windows.

Example receiver functions impacted by the embodiment of FIG. 9A (requiring selection of different outputs (FIG. 9B) of the signal processing and combining circuit 900; some of the functions may use more than one possible output) include (i) earliest signal arrival detection, (ii) a data decode function (strongest signal selection) (iii) carrier phase tracking, and (iv) enhanced signal detection.

In some embodiments there is more than one instance of FIG. 9A, one for each required function. For example, the pass through function may be used on entry to signal track state. In this case there has not been time to identify multipath components. As another example, the embodiment of FIG. 9A may be used for earliest signal arrival. In this case there are two output options, the first of which is to subtract all but the earliest identified multipath component from the input signal ($I_{100msecs}$, $Q_{100msecs}$). If this option is selected, the output ($I^*_{100msecs}$, $Q^*_{100msecs}$) is passed to further receiver functions with only the LOS signal present. As such, the LOS signal may be the best candidate for signal tracking in terms of forming the best estimate of range and range rate measurements (but not necessarily the best candidate for other receiver functions). The second one of the two output options is to have the receiver further functions operate on the reconstructed earliest identified multipath component, selected output from the identification and reconstruction circuit 925.

The data decode function may use the strongest/largest CNO multipath component (i.e., the component for which the carrier to noise ratio over one second, which may be referred to as "CNO") is greatest. As described above, in general multipath components are not carrier phase aligned with each other and can effectively interfere with each other. In some embodiments, there are two basic options. A first basic option may be to identify the strongest single multipath component (under benign conditions this may be the LOS signal) and feed this signal to the data decode function. A second basic option may be to carrier phase adjust the strongest identified multipath components and phase rotate them such that they are carrier phase aligned before being added, then feed this combined signal into the data decode function (this the Rake receiver function). This function may send the identified components from the third output 950 (FIG. 9B) of the signal processing and combining circuit 900 to a further Rake receiver function block.

The carrier phase tracking function is important in GNSS as it enables the highest accuracy receiver applications such as PPP and RTK. Also important is that carrier phase tracking allows approximately 2 dB sensitivity gain on the data decode function. Carrier phase tracking requires a minimum CNO to be present such that the receiver may be able to code and AFC carrier track the LOS signal but not be able to carrier phase track it. In this case outputs 2 (945 (FIG. 9B)) or 3 (950 (FIG. 9B)) of the signal processing and combining circuit 900 may be used. In the case of output 2 the incoming correlations have other identified multipath components subtracted from them, leaving the target multipath component that can be carrier phase tracked.

Enhanced signal detection may be used for signals that have CNOs that are too low to be identified in the multipath identification block. The lowest detectable GNSS signal may require many seconds of integration before the signal can be detected (e.g. 5-60 seconds). In this case output 2 (945 (FIG. 9B)) of the signal processing and combining circuit 900 is used with all identified multipath components subtracted from the input correlations. The output is then free of known multipath components leaving the signal available for enhanced signal search algorithms (e.g., much longer integration times).

FIG. 9A shows 100 ms coherent time being used. Some receiver functions, such as carrier phase tracking, may require a faster update rate (e.g. every 20 ms). In these cases the multipath identification operation may still run at 100 ms but the application to particular receiver functions may be applied at 20 ms. In other words the multipath components identified at 100 ms are still applicable every 20 ms (same identified components applied five times in a row).

Individual multipath component tracking may be advantageous for the receiver, especially in L5 tracking where the correlation function is narrow (+/−30 meters) to identify and individually track each multipath component. In other words output 2 of the signal processing and combining circuit 900 of FIG. 9A is created by removing all but one multipath component such that it can be tracked. This method may be advantageous in fast changing environments, where individual multipath components can come and go every second. In these cases the receiver may quickly switch its data decode, carrier phase tracking and other receiver functions between multipath components.

An additional use of knowledge about multipath components is using it to determine what kind of environment the receiver is in. The navigation engine, which commonly uses a Kalman Filter, may use this knowledge to tune the expected statistical error profile for range and range rate measurements. This may involve having pre-stored error models that are chosen based on recent measured multipath history. For example, if the receiver has detected a number of large offset (example 200 meters delay) multipath components, the receiver's navigation engine may switch to an error model that assumes large path delays.

Figure 9B:
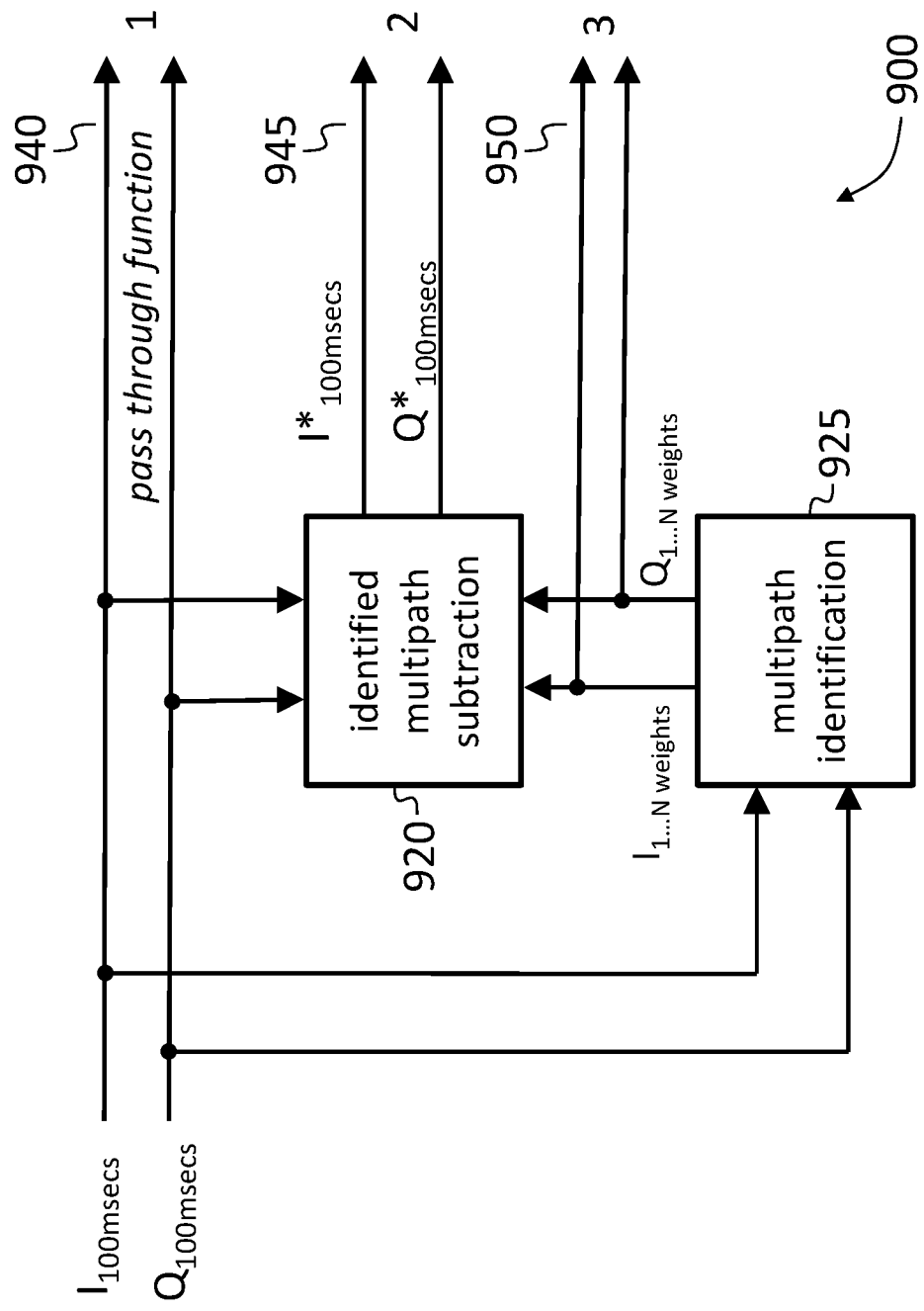
FIG. 9B is a block diagram of correlation choices, according to an embodiment of the present disclosure.

FIG. 9B shows the signal processing and combining circuit 900. In some embodiments, signals from the three outputs 940, 945, 950 of the signal processing and combining circuit 900 may be used on arbitrary combinations by a subsequent circuit (instead of only one of the three outputs 940, 945, 950 being selected (by the multiplexer 905), as in FIG. 9B).

In some embodiments the multipath estimation circuit 150 is constructed as a processing circuit. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB. Other circuits, e.g., the circuits for performing other receiver functions, may also be implemented as processing circuits (e.g., as part of the same processing circuit as the multipath estimation circuit 150).

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the disclosure.

The terminology used herein is for the purpose of describing particular embodiments only and is not intended to be limiting of the disclosure. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of a disclosed concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for multipath mitigation in global navigation satellite system receivers have been specifically described and illustrated herein, many modifications and variations will be apparent to those skilled in the art. Accordingly, it is to be understood that a system and method for multipath mitigation in global navigation satellite system receivers constructed according to principles of this disclosure may be embodied other than as specifically described herein. The disclosure is also defined in the following claims, and equivalents thereof.

What is claimed is:

1. A method for reducing errors in a global navigation satellite system (GNSS) by performing multipath estimation, the method comprising:
   performing a first weight estimation operation for a first number of multipath components of a received correlation;
   calculating a remaining error energy by subtracting a sum of estimated multipath components from the received correlation;
   determining that a satisfaction criterion is not met for the remaining error energy;
   performing a second weight estimation operation for a second number of multipath components, the second number being greater than the first number;
   wherein the second weight estimation operation comprises:
      subtracting, from the received correlation, first estimates of the second number of multipath components except a first multipath component, to form a first residual correlation;
      estimating the first multipath component according to a delay and amplitude of a peak in the first residual correlation to form a second estimate of the first multipath component;
      subtracting from the received correlation the second estimate of the first multipath component, the first estimates of the multipath components except the first multipath component and a second multipath component, to form a second residual correlation; and estimating the second multipath component according to a delay and amplitude of a peak in the second residual correlation; and using, by a GNSS receiver, a multipath mitigated signal constructed based on the first weight estimation operation and the second weight estimation operation.

2. The method of claim 1, wherein the second weight estimation operation comprises executing a loop P times unless a loop exit is performed, P being a positive integer equal to the second number of multipath components, a first and second execution of the loop comprising the estimating of the first multipath component and the estimating of the second multipath component.

3. The method of claim 2, wherein the second weight estimation operation further comprises:

subtracting from the received correlation the first estimates of the multipath components except the first multipath component and the second multipath component, to form a third residual correlation;

determining whether an amplitude of a peak in the third residual correlation exceeds an error energy threshold; and in response to determining that the amplitude of the peak in the third residual correlation does not exceed the error energy threshold, performing a loop exit.

4. The method of claim 1, wherein the received correlation is the real part of a received complex correlation, the method further comprising performing an imaginary weight estimation operation for a first number of imaginary multipath components of an imaginary part of the received complex correlation.

5. The method of claim 1, wherein the received correlation is a correlation of a received global navigation satellite system signal.

6. The method of claim 1, further comprising processing a lowest-delay multipath component with a navigation engine.

7. The method of claim 1, further comprising processing a lowest-delay multipath component having an estimated amplitude exceeding a carrier phase tracking threshold with a carrier phase tracking circuit.

8. The method of claim 1, further comprising processing a multipath component having a largest estimated amplitude with a data decoding circuit.

9. The method of claim 1, wherein the satisfaction criterion is met when the remaining error energy is less than a set threshold.

10. The method of claim 1, further comprising:

receiving a global navigation satellite system signal with a receiver having a bandwidth of at least 10 MHz, and forming the received correlation from the global navigation satellite system signal.

11. A system for reducing errors in a global navigation satellite system (GNSS) by performing multipath estimation, the system comprising a multipath estimation circuit configured to:

perform a first weight estimation operation for a first number of multipath components of a received correlation;

calculate a remaining error energy by subtracting a sum of estimated multipath components from the received correlation;

determine whether a satisfaction criterion is met for the remaining error energy; in response to determining that the satisfaction criterion is not met:

perform a second weight estimation operation for a second number of multipath components, the second number being greater than the first number;

wherein the second weight estimation operation comprises:

subtracting, from the received correlation, first estimates of the second number of multipath components except a first multipath component, to form a first residual correlation;

estimating the first multipath component according to a delay and amplitude of a peak in the first residual correlation to form a second estimate of the first multipath component, subtracting from the received correlation the second estimate of the first multipath component, the first estimates of the multipath components except the first multipath component and a second multipath component, to form a second residual correlation; and estimating the second multipath component according to a delay and amplitude of a peak in the second residual correlation; and using, by a GNSS receiver, a multipath mitigated signal constructed based on the first weight estimation operation and the second weight estimation operation.

12. The system of claim 11, wherein the second weight estimation operation comprises executing a loop P times unless a loop exit is performed, P being a positive integer equal to the second number of multipath components, a first and second execution of the loop comprising the estimating of the first multipath component and the estimating of the second multipath component.

13. The system of claim 12, wherein the second weight estimation operation further comprises:

subtracting from the received correlation the first estimates of the multipath components except the first multipath component and the second multipath component, to form a third residual correlation;

determining whether an amplitude of a peak in the third residual correlation exceeds an error energy threshold; and in response to determining that the amplitude of the peak in the third residual correlation does not exceed the error energy threshold, performing a loop exit.

14. The system of claim 11, wherein the received correlation is the real part of a received complex correlation, the multipath estimation circuit being further configured to perform an imaginary weight estimation operation for a first number of imaginary multipath components of an imaginary part of the received complex correlation.

15. The system of claim 11, wherein the received correlation is a correlation of a received global navigation satellite system signal.

16. The system of claim 11, wherein the multipath estimation circuit is further configured to process a lowest-delay multipath component with a navigation engine.

17. The system of claim 11, wherein the multipath estimation circuit is further configured to process a lowest-delay multipath component having an estimated amplitude exceeding a carrier phase tracking threshold with a carrier phase tracking circuit.

18. The system of claim 11, wherein the multipath estimation circuit is further configured to process a multipath component having a largest estimated amplitude with a data decoding circuit.

19. The system of claim 11, wherein the satisfaction criterion is met when the remaining error energy is less than a set threshold.

20. The system of claim 11, further comprising a multiplexer configured to produce an output select from among:
  the received correlation;
  the received correlation, less one or more estimated multipath components; and
  the estimated multipath components.

\* \* \* \* \*